Nov. 2, 1965 A. K. SMITH 3,215,812
STUB WELDING MACHINE
Filed Sept. 18, 1962 3 Sheets-Sheet 1

Inventor
Allan Keppie Smith
By *J. P. Moran*
Attorney

United States Patent Office 3,215,812
Patented Nov. 2, 1965

3,215,812
STUB WELDING MACHINE
Allan Keppie Smith, Renfrew, Scotland, assignor to Babcock & Wilcox, Limited, London, England, a company of Great Britain
Filed Sept. 18, 1962, Ser. No. 224,345
Claims priority, application Great Britain, Sept. 20, 1961, 33,741/61
3 Claims. (Cl. 219—125)

This invention relates to welding machines. A stub welding machine is known, in which a welding nozzle is carried by a rotary body driven at suitable speed around the stub to be welded to a base member. In order to effect a sound weld it is desirable or necessary to shield the arc from the atmosphere. This may be done by the adoption of submerged arc welding, but the welding process is then slow. A great advantage would accrue from a machine enabling a sounder weld of better shape to be made more expeditiously.

The present invention includes a stub welding machine suitable for arc welding a stub to a base member by means of a consumable electrode, including a welding nozzle carried by a body adapted for relative rotation during the welding operation between the stub and the body and consequent rotation of the nozzle relative to the stub axis, a nozzle support member movable axially and radially in relation to the stub respectively by an axial actuating mechanism and a radial actuating mechanism and automatic or semi-automatic control means adapted through control of operation of the mechanisms to vary the positioning of the nozzle as the welding operation proceeds.

Advantageously, the welding nozzle is adapted to operate with gas shielding of the arc. The gas may suitably be $CO_2$.

The invention also includes a stub welding machine suitable for arc welding a stub to a base member by means of a consumable electrode, including a welding nozzle adapted to operate with gas-shielding of the arc which is carried by a body adapted for relative rotation during the welding operation between the stub and the body and consequent rotation of the nozzle relative to the stub axis and which is movable in relation to the body by actuating means and automatic or semi-automatic control means adapted through control of operation of the actuating means to vary the positioning of the nozzle as the welding operation proceeds.

The invention also includes electric arc welding apparatus in which a welding wire feed is adapted to supply the wire at a constant or substantially constant rate, a power source is arranged to supply current at high densities to the welding wire and adjusting means responsive to welding current variations are adapted to effect movements of the welding nozzle tending to maintain a substantially constant length of extension of wire from the nozzle. Suitably, the adjusting means is responsive to the difference between the voltage drop across a shunt in the welding current circuit and a preset voltage.

The invention will now be described, by way of example, with reference to the accompanying partly diagrammatic drawings, in which.

Figure 1:
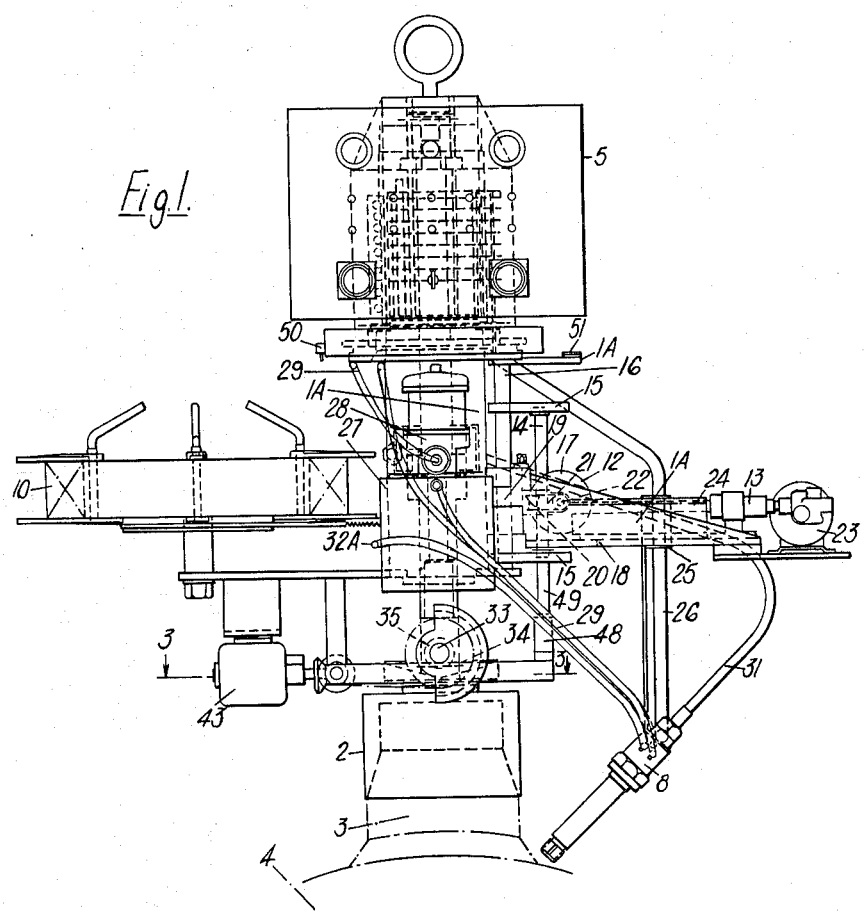
FIG. 1 is a side elevation of a welding machine mounted on a stub to be secured to a base member.
Figure 2:
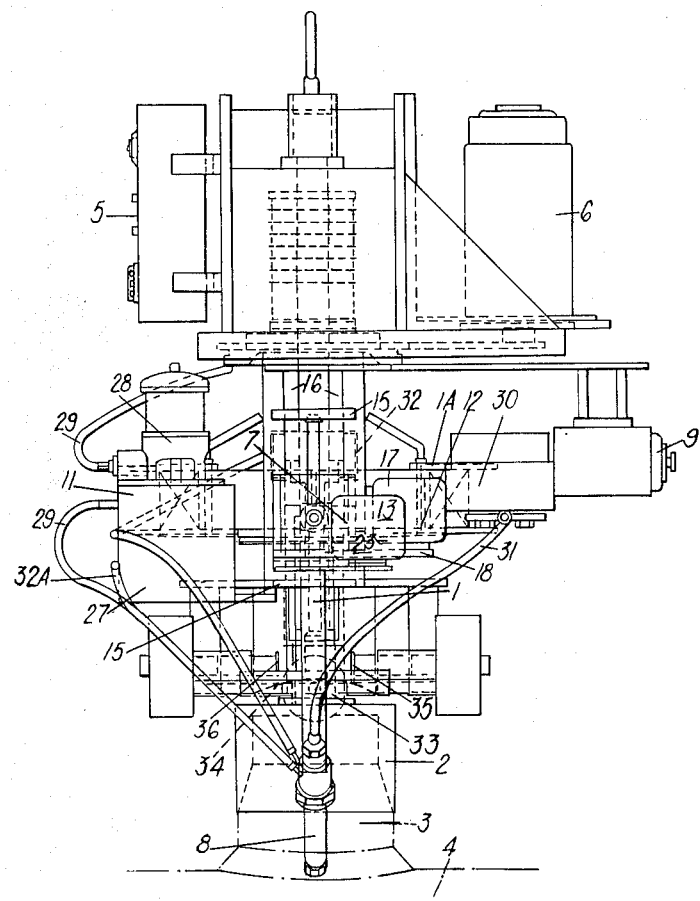
FIG. 2 is an elevation of the machine of FIG. 1 and viewed from the right hand side of that figure.

The welding machine of FIGS. 1 and 2 comprises a central support shaft or spindle 1 having at one end a chuck or clamp means 2 adapted to grip a stub 3, to be welded in position on a base member or work piece, such as a cylindrical vessel 4, and to hold the support shaft in axially aligned relationship with the stub 3. A control panel 5 and a variable speed drive motor 6 are supported from the shaft 1 adjacent one end thereof remote from the chuck 2.

Rotatably mounted on the support shaft 1 is a carriage 1A supporting a positioning assembly 7, a welding nozzle assembly 8, a wire drive motor 9, a wire spider unit 10, and a water cooling unit 11.

The positioning assembly 7 is adapted to position the welding nozzle assembly 8 by movement in a plane including the axis of the support shaft 1 and includes axial actuating mechanism 12 and a radial actuating mechanism 13. The axial actuating mechanism 12 comprises a lead screw 14 arranged parallel to the support shaft 1 the lead screw 14 being supported at its ends in spaced brackets 15 which are movable, axially with respect to shaft 1 on a pair of spaced parallel guides 16 which are secured to the carriage 1A. The axial actuating mechanism 12 includes a constant speed, reversible drive motor 17 mounted on a platform 18 formed with sleeve means 19 slidably engaging the parallel guides 16 for movement of the platform axially of the support shaft 1. Laterally extending from the sleeve means 19 is a collar 20 through which the lead screw 14 passes and the collar embraces a nut 21 rotatable within the collar and threaded on to the lead screw 14 so that movement of the nut 21 along the screw 14 causes corresponding movement of the platform 18 axially of shaft 1. The nut 21 is formed externally as a worm wheel and engages a worm 22 rotatably mounted in the collar 20 for rotation about an axis normal to the axis of shaft 1, and the worm is connected to the drive shaft of the reversible motor 17.

The radial actuating mechanism comprises a constant speed, reversible radial drive motor 23 mounted on an extension of platform 18 and operating through suitable gearing to drive a lead screw 24 which is mounted in bearings on the platform extension to extend radially of support shaft 1. A cross head 25 engages the lead screw 24 by suitable threaded connection for movement of the cross-head radially of shaft 1 along and under the influence of the lead screw 24. The cross head 25 has a downward extension 26 at the lower end of which is secured the welding nozzle assembly 8 for movement of the nozzle 8 radially with cross-head 25 and axially with platform 18.

The water cooling unit 11 which is mounted on the carriage 1A comprises a water tank or reservoir 27 in conjunction with an electrically driven water pump 28 which is mounted above the tank and is arranged to circulate cooling water by way of suitable flexible tubing 29 through the wire drive motor 9, and the welding nozzle 8.

The wire spider unit 10 is arranged to hold a coil of suitable welding wire and is mounted on an arm of the carriage 1A for rotation about an axis parallel to the shaft 1. The wire drive motor 9 is arranged to drive wire drive means 30 which receive the weld wire from the spider unit 10 and feed the weld wire to the welding nozzle 8 by way of a suitable flexible guide tube 31.

The welding nozzle 8 is arranged to operate with gas shielding of the weld arc, and to this end the support shaft 1 is formed internally with a duct arranged to receive suitable shielding gas, for example $CO_2$, from a source, not shown, remote from the welding machine and to supply the gas to a chamber 32 surrounding a length of the shaft and supported on the carriage 1A for rotation about the shaft. The chamber 32 is suitably sealed to the shaft to prevent gas leakage and is connected for the supply of shielding gas to the nozzle by way of a flexible pipe 32A.

At the lower end of the support shaft 1, compensating means 33 are provided for effecting movements of the weld nozzle 8 to compensate for the contour shape of the work piece 4 in order to maintain a substantially constant distance between the weld nozzle tip and weld groove defined between the work piece 4 and the stub 3 to be welded. The compensating means 33 as most clearly seen in FIGURE 3 comprise a cam 34 and cam follower means 35, 36 in an arrangement of the nature claimed in the specification of British Patent No. 871,459. The cam 34 is formed as an annular plate secured to the support shaft 1 adjacent the chuck 2. The surface of the cam 34 remote from chuck 2 is formed with a contour proportional to that of the work piece 4 in the region adjacent the stub 3, the cam 34 being turned through 90° about the axis of shaft 1 relative to the workpiece 4 in view of the operating characteristics of the associated mechanism described below. Thus as seen in FIG. 2 the cam 34 has a convex profile, proportional to the convex profile of the workpiece in FIG. 1, and in FIG. 1 the cam has a flat profile corresponding to the flat profile of the workpiece in FIG. 2, the cam surface having displacements measured axially of shaft 1 equal to half corresponding displacements on the workpiece and displacements measured radially of the axis of shaft 1 equal to one-third of corresponding displacements on the workpiece 4. Thus if a displacement of 1 inch in a direction axially of the shaft 1 obtains on the workpiece 4 at a distance of 9 inches radially from the axis of the shaft 1, then a displacement of ½ inch axially of the shaft 1 will obtain on the cam 34 at a distance of 3 inches radially from the shaft axis in a direction perpendicular to that of the measurement on the workpiece 4.

Figure 3:
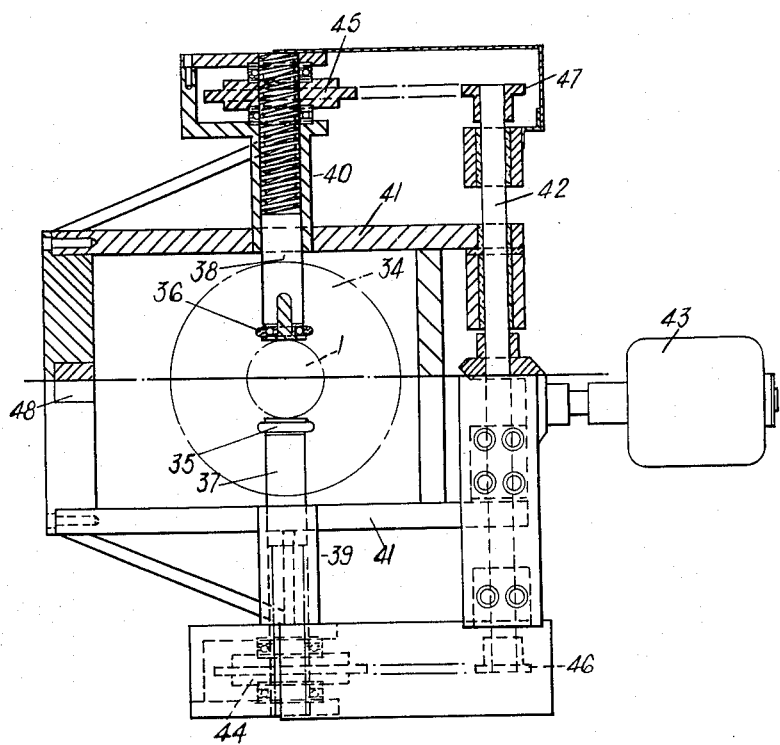
FIG. 3 is a view taken on the line 3—3 of FIG. 1 of cam operating mechanism to an enlarged scale, the upper half of the figure being in section.

A pair of cam followers 35, 36 are arranged to roll over the cam surface and are mounted on ball bearings at the inner end of respective support shafts 37, 38 which extend outwardly away from the axis of shaft 1 along a common diameter as seen in FIG. 3. The shafts 37, 38 are mounted in respective sleeves 39, 40 secured in a rectangular fram 41 which is pivotally mounted at one end on a shaft 42 extending normally to the axis of shaft 1, and parallel to shafts 37, 38. The shafts 37, 38 are free to move axially in respective sleeves 39, 40 but are secured against rotational movement by studs engaging keyways formed in the sleeves 39, 40. The frame 41 embraces the cam 34 and shaft 1 and is tiltable about shaft 42 by the influence of the cam 34 on the cam followers 35, 36. The shaft 42 is supported in bearings from the carriage 1A which also supports a constant speed, reversible cam operating motor 43 arranged to rotate the shaft 42 through suitable gearing and the shaft 42 is disposed on a side of the shaft 1 diametrically opposite to the positioning assembly 7. The outer ends of shafts 37, 38 are screw threaded and engage threaded bores formed centrally in respective sprockets 44, 45 which are held captive as regards axial movements in extensions of the frame 41 but are free to rotate in suitable ball bearings. The sprockets 44, 45 are driven through chains from respective drive sprockets 46, 47 mounted at the ends of the shaft 42 so that drive from the motor effects movement of the cam followers 35, 36 across the cam surface. The ends of the shafts 37, 38 are threaded in oppositely handed manner, as are the associated sprockets 44, 45, so that the followers move outwardly or inwardly in unison with respect to the axis of shaft 1.

The frame 41 is formed with an arm 48 on a side of the shaft 1 opposite to shaft 42, the arm extending parallel or substantially parallel to the shaft 1 on a side of the frame remote from chuck 2, and its end is arranged to engage the lower end of a thrust rod 49 extending downwardly from, and rigidly secured to the lower bracket 15 of the positioning assembly. Thus upward or downward movements of arm 48 cause through thrust rod 49 corresponding upward or downward movements of the positioning assembly 7 and of the weld nozzle 8. Such movements of the arm 48 are occasioned by pivotal movement of the frame 41 about shaft 42 which in turn is occasioned by the action of the cam 34 on the cam followers 35, 36 as the followers are moved across the cam. It will be appreciated that the movement of the arm 48 axially of shaft 1 will be greater than that of the cam followers 35, 36 owing to the lever action of the frame 41 which by virtue of the central positioning of the cam 34 relative to the frame 41 exhibits a lever ratio of 2 to 1. In consequence the vertical displacements on the cam 34 are half the corresponding displacements on the workpiece 4.

The cam operating motor 43 is suitably electrically coupled to the radial positioning motor 23 so that any radial movement of the weld nozzle 8 is accompanied by a similar but proportionally smaller movement of the cam followers 35, 36 radially of the cam 34. The velocity ratio of the radial movement of the weld nozzle 8 to the speed of radial positioning motor 23, is suitably set by choice of the motor gearing and the lead of the crosshead lead screw thread with reference to the velocity ratio of the cam followers to the speed of the cam operating motor 43 due to the gearing between motor 43 and shaft 42, the chain and sprocket drives 44, 45, 46, 47 from the shaft 42 to the shafts 39, 40 and the pitch of the thread on the shafts 39, 40 so that for a given radial movement of the weld nozzle 8 due to the rotation of the radial positioning motor 23 the cam followers 35, 36 move radially by one-third of the distance due to rotation of the cam operating motor 43.

The variable speed drive motor 6, mounted on the shaft 1, is connected through suitable gearing to drive the carriage 1A to rotate about shaft 1. A static trip switch 50 is supported on a plate secured to the shaft 1 and is arranged to be operated once in each revolution of the carriage 1A about the shaft 1 by a trip member 51 projecting from and rotatable with carriage 1A. The trip switch 50 is adapted on operation to initiate operation of two presettable timer units, not shown mounted on the control panel 5 and the timer units are adapted to effect energization and operation of the radial positioning motor 23 and the axial positioning motor 17, respectively, for the times preset on the timer units. It will be understood that by virtue of the electrical coupling of the radial positioning motor 23 and the cam operating motor 43, the cam operating motor 43 will rotate at the same time and for the same period as the radial positioning motor 23.

It will be understood that the motors 17, 23 and 43 are suitably adapted to operate at the same constant speed of rotation.

A set of slip rings and corresponding brushes is provided at the upper end of the shaft 1 to provide electrical connection between an external source of electrical power, not shown, the control switches and timer devices on the control panel and the various electric motors of the welding machine. The control panel 5 carries suitable control circuits and switches for the motors 6, 17 and 23 for starting, stopping and controllably varying the speed of the drive motor 6, for controlling the direction of rotation, the starting and stopping of the axial drive motor 17 and the radial drive motor 23, for controlling the speed and operation of the weld wire drive motor 9 and for operating the pump motor. Shielding gas is suitably supplied to the machine through an electrically operated shut-off valve adapted to open at the commencement of a welding operation and close at the end thereof. A suitable current contactor is provided for controlling the welding current and the shielding gas valve and current contactor are suitably controlled by start and stop switches arranged to initiate and terminate a welding operation.

In operation, after the machine has been mounted on the stub 3 which is suitably tack welded in position on the vessel 4, the welding nozzle 8 is properly positioned with respect to the groove between the stub 3 and the vessel 4 by manual operation of the axial and radial drive motors 17 and 23 through their control switches. It will be understood that corresponding operation of the cam operating motor 43 occurs because of the electrical connection between the motor and the radial drive motor 23. Operation of the "start" switch causes the water cooling pumps 28 to start, the shielding gas nozzle to open, the wire drive motor 9 and the drive motor 6 to start, and the current contactor to close to initiate welding current. The drive motor 6 effects rotation of the nozzle 8 around the wled groove and the nozzle effects a first weld deposit.

As the nozzle 8 moves around the welding groove under the influence of rotating carriage 1A, the cam followers 35, 36 are rotated about the axis of shaft 1, rolling around the surface of cam 34 and moving up, or down, axially of the shaft 1 according to the contour of the cam surface. Corresponding movements are transferred to the nozzle 8 through pivotal movement of the frame 41 and movement of the thrust rod 49 and corresponding movement of the positioning assembly 7 by sliding of brackets 15 along guide rods 16. Thus the nozzle 8 moves axially of the rod 1 to follow the workpiece contour and maintain a substantially constant spacing between the nozzle 8 and the workpiece.

The timer units 52 and 53 are suitably set so that operation of the trip switch occasions operation of the axial and radial drive motor 17, 23 respectively for such times that the welding nozzle moves axially and radially by suitable amounts properly to position the weld nozzle 8 for a second weld pass. After a first rotation of the nozzle 8 about the weld groove, and completion of the first weld pass, the trip 51 operates the switch 50 to cause operation of motors 17, 23 under the control of the timer units, to position the weld nozzle for the second weld pass.

Operation of radial drive motor 23 is accompanied by corresponding operation of the cam operating motor 43 and consequent movement apart, or together, of the cam followers 35, 36 corresponding proportionally to radial outward, or inward, movement of the nozzle 8. Thus the nozzle 8 is properly axially positioned for the second weld pass and set to follow a path along the workpiece due to the position of the cam followers 35, 36, corresponding to the contour of the workpiece along the second weld pass.

If the timer units are left at the same settings, a similar movement will occur at the end of the second pass and in this manner several layers of weld metal may be deposited. However initially it is generally preferable to reset the timer units after the first six weld passes so that successive layers of weld metal are deposited at desired locations of the weld groove. For subsequent passes it is not normally necessary to reset the timer units. For example, a simple sequence for a three pass fillet weld is as follows:

(a) The start switch is operated and welding of the first pass commences. The timer associated with the radial drive motor 23 is set for a suitable radial displacement of the weld nozzle.

(b) At the end of the first pass, the trip switch 50 is operated and the radial timer unit controls radial movement of the weld nozzle for deposition of weld metal along side that of the first pass. The timer units are reset for suitable radial inward movement of the weld nozzle and axial movement away from the weld deposits already made.

(c) At the end of the second pass the trip switch 50 is operated and the axial and radial timer units control axial and radial movement of the nozzle 8 so that it moves radially inwards and away from the deposits of the first and second passes to a position above the first pass weld deposit.

(d) The third pass is made laying a weld deposit over that of the first pass deposit and the "stop" switch is operated to terminate the welding operation.

It will be understood that the timer units 52, 53 could equally well be revolution counters arranged to terminate operation of the associated motors after a predetermined but adjustable number of revolutions and also that the timer units or the revolution counters could be operated in conjunction with suitable sequence relays to obviate or reduce the need for resetting of the timer units or revolution counters between weld passes. By using a stepping relay system fewer relays are required than in a simple sequence relay system, and a suitable stepping relay system includes a relay selector adapted to operate and select relays according to a predetermined sequence or program.

Alternative means may be used for the cam operated compensating means 33 described. For example, when the workpiece is of ferro-magnetic material a proximity meter, that is an electro-magnetic device responsive to movements towards or away from the ferro-magnetic material, may be arranged to effect adjustment of the position of the welding nozzle in relation to the body by operation, through intermediate relay means, of a servo-motor interposed between the welding nozzle and the positioning assembly on which the welding nozzle is mounted. Alternatively, the compensation may be effected by similar control of the servo-motor which is carried out under the control of a program carried on a tape or other suitable means.

In a further form of compensating means, the welding wire drive motor 9 is adapted to supply the welding wire at a constant or substantially constant rate, a power source is arranged to supply current at high densities to the welding wire and adjusting means responsive to welding current variations are adapted to effect movements of the welding nozzle 8 tending to maintain a substantially constant length of extension of the wire from the nozzle.

Suitably, the adjusting means is in the form of a servo-motor interposed between the welding nozzle and the positioning means 7 on which the welding nozzle 8 is mounted and the adjusting means is responsive to the difference between the voltage drop across a shunt in the welding current circuit and a preset voltage. The difference in voltage is suitably amplified.

The power source supplies the welding current at a relatively constant potential, but with a 1.2 mm. welding wire, fed at a suitable speed, variation in the extension of the wire from the nozzle between ⅜ of an inch and ⅝ of an inch may cause the current to vary from 360 amp. to 320 amp., the current at a mean extension of ½" being approximately 340 amp. In operation, therefore, the contour of the workpiece 4 leads to a variation in the distance between the welding groove and the tip of the welding nozzle, and the current variation causes operation of the servo-motor to move the welding nozzle and maintain the length of extension of the wire from the nozzle approximately constant.

Suitably the weld nozzle 8 is provided with angle control means for controlling the inclination of the nozzle and adapted to maintain the weld wire normal to the direction of relative movement between the nozzle 8 and the workpiece 4. When the compensating means are of the further forms described above and include adjusting means responsive to the difference between the voltage drop across a shunt in the welding current circuit and a preset voltage, the angle control means are responsive to the said voltage difference and to an opposing voltage proportional to the angle of inclination of the axis of the welding nozzle 8 to a plane containing the axis of the stub 3 and the intersection between the nozzle axis and the workpiece 4.

The welding nozzle 8 is suitably mounted to permit adjustment of inclination which is effected by any suitable servo-motor or solenoid. The said voltage difference is approximately proportional to the inclination of the surface of the base member at the weld pool to a plane normal to the spindle on which the body is mounted. The opposing voltage may be produced in any suitable manner.

In operation, when moving down an incline the welding nozzle 8 is rocked so that its axis is inclined rearwardly towards the workpiece and when the nozzle is moving up an incline it is rocked so that its axis is inclined forwardly towards the workpiece so that at all times the welding wire approaches the workpiece 4 in a direction approximately normal to the direction of relative movement between the workpiece 4 and the nozzle.

Suitably the machine described is supported on a boom extending laterally from a pillar on a movable carriage, for example a bogie carriage movable on a track, the boom being swingable about the pillar and the machine movable along the boom. In operation the machine is positioned over a stub to be welded and then is lowered onto the stub to be secured thereto in the manner described. The weight of the machine suitably serves to hold the stub in proper position prior to welding and to this end the machine is suitably loaded.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A stub welding machine suitable for arc welding a stub tube to a base member having a curved surface by means of a consumable electrode including a spindle, means for supporting said spindle in axial alignment with said stub, a body mounted for rotation about said spindle, power driven means for rotating said body about the spindle, a welding nozzle, a member mounted on said body for supporting said nozzle, power driven means for moving said member on said body axially of the axis of said stub, a separate power driven means for moving said member on said body radially of the axis of said stub, control means actuating said power means to vary the position of the nozzle relative to the stub, and mechanical means including a cam and motor driven cam follower mechanism to effect movement of the welding nozzle in relation to the welding groove at the junction of the stub and the curved surface of the base member to maintain approximately constant the distance between the welding nozzle and the weld groove.

2. A stub welding machine according to claim 1 wherein said mechanical means includes a cam follower frame pivotably mounted normal to and transversely spaced from the axis of said spindle.

3. A stub welding machine according to claim 2 wherein an arm interconnects said frame with said member to transmit movement of said frame to said member.

References Cited by the Examiner

UNITED STATES PATENTS 1,949,251  2/34  Gilbert _____ 219—125

FOREIGN PATENTS 874,258  8/61  Great Britain.

RICHARD M. WOOD, *Primary Examiner.*
JOSEPH V. TRUHE, *Examiner.*